(12) United States Patent
Chavez et al.

(10) Patent No.: US 8,484,704 B2
(45) Date of Patent: Jul. 9, 2013

(54) NEXT GENERATION INTEGRATION BETWEEN DIFFERENT DOMAINS, SUCH AS, ENTERPRISE AND SERVICE PROVIDER USING SEQUENCING APPLICATIONS AND IMS PEERING

(75) Inventors: David L. Chavez, Broomfield, CO (US); Larry J. Hardouin, Broomfield, CO (US); Gregory D. Weber, Westminster, CO (US)

(73) Assignee: Avaya Inc., Basking Ridge, NJ (US)

( * ) Notice: Subject to any disclaimer, the term of this patent is extended or adjusted under 35 U.S.C. 154(b) by 342 days.

(21) Appl. No.: 12/701,168

(22) Filed: Feb. 5, 2010

(65) Prior Publication Data
US 2011/0067091 A1  Mar. 17, 2011

Related U.S. Application Data

(60) Provisional application No. 61/242,889, filed on Sep. 16, 2009.

(51) Int. Cl.
H04L 29/06 (2006.01)

(52) U.S. Cl.
USPC ......... 726/5; 726/1; 726/2; 726/3; 726/4; 726/6; 726/13; 726/15

(58) Field of Classification Search
None
See application file for complete search history.

(56) References Cited

U.S. PATENT DOCUMENTS

| 7,408,925 | B1 | 8/2008 | Boyle et al. |
| 2003/0179762 | A1* | 9/2003 | Isomaki et al. ............ 370/401 |
| 2008/0301787 | A1 | 12/2008 | Lindholm et al. |
| 2010/0115598 | A1* | 5/2010 | Barriga et al. ............ 726/8 |
| 2010/0278171 | A1* | 11/2010 | Ku et al. ............ 370/352 |
| 2011/0103265 | A1* | 5/2011 | Saklikar et al. ............ 370/259 |

FOREIGN PATENT DOCUMENTS

| CN | 101132340 | 2/2008 |
| CN | 101179389 | 5/2008 |
| KR | 1020060076804 | 7/2006 |
| KR | 1020080050971 | 6/2008 |
| WO | WO 2009/016967 | 2/2009 |

OTHER PUBLICATIONS

Jinho Hwang et al. "The Research of Evolved Networks for IMS Services Interworking", Feb. 2008, ICACT 2008, ISBN 978-89-5519-136-3, pp. 1454-1457.*
N/A, "IMS Registration" Nov. 2007, EvebtStudio System Designer, pp. 1-4, retrieved from: http://www.eventhelix.com/ims/registration/ims_registration.pdf.*
Background of the Invention for the above-captioned invention filed Feb. 5, 2010.
U.S. Appl. No. 12/701,165, filed Feb. 5, 2010, Brunson et al.
Boyle et al., U.S. Appl. No. 12/493,031, Entitled "Internal/External Network Identifier", filed Jun. 26, 2009, 24 pages.

(Continued)

*Primary Examiner* — Jung Kim
*Assistant Examiner* — Adrian Stoica
(74) *Attorney, Agent, or Firm* — Sheridan Ross P.C.

(57) ABSTRACT

The present invention provides mechanisms for sharing user information, including user authentication information, across communication networks and more specifically across networks separated by one or more Session Border Controllers (SBCs). The authentication of a user at one network can be leveraged by the second network to invoke one or more applications at the second network in connection with administering a communication session for the user.

20 Claims, 4 Drawing Sheets

OTHER PUBLICATIONS

Tango Networks, "Any Phone, One Solution. Let's Tango", available at www.tango-networks.com, Tango Networks, Inc., 2009-2010, 2 pages.
Official Action with English translation of Official Action for Korea Patent Application No. 2010/0091288, dated Apr. 13, 2012 8 pages.
Notice of Allowance with English translation for Korea Patent Appication No. 10-2010-0091288, dated Oct. 25, 2012 3 pages.
Official Action (with English translation) for Chinese Patent Application No. 201010287181.2 dated Feb. 28, 2013, 12 pages.

* cited by examiner

NEXT GENERATION INTEGRATION BETWEEN DIFFERENT DOMAINS, SUCH AS, ENTERPRISE AND SERVICE PROVIDER USING SEQUENCING APPLICATIONS AND IMS PEERING

CROSS-REFERENCE TO RELATED APPLICATIONS

This application claims the benefit of U.S. Provisional Patent Application Ser. No. 61/242,889, filed Sep. 16, 2009, the entire disclosure of which is hereby incorporated herein by reference.

FIELD OF THE INVENTION

The invention relates generally to communications and more specifically to communication network integration.

BACKGROUND

Many businesses and other enterprises currently desire to include and recognize internal and external parties in their network. The inclusion and recognition of internal parties is relatively easy as there is usually a high degree of trust between the internal party and the enterprise. Trust between an external party and the enterprise, however, is not as well established. The difficulty with this situation is that the enterprise may desire to provide services to the external party similar to services made available to internal parties and the external party may desire to access such features as easily as an internal party. The main problem encountered by many enterprises is the need to balance the desire to provide useful and possibly new services to internal and external parties while preserving the security of the enterprise and parties involved in the interaction.

For several years the world's communication SPs (Service Providers) have been working with the 3GPP (3rd Generation Partnership Project) to create a set of interoperable standards to provide voice, video, and data services to their subscribers based on SIP (Session Initiation Protocol), the underlying protocol of IMS (IP Multimedia Subsystem).

The IMS standards allow SP's the ability to expose applications and services to their users independent of the communication device being used by the user. Currently, there is no way to extend or coordinate these applications and services (such as multiple applications/services that operate on the same call—i.e. sequenced applications) within an SP domain to users that are only identifiable in a different domain (e.g., an enterprise domain). Providing common services would lower the total cost of ownership because the cost could be internalized, ease deployment of new services to a larger community, and provide better coordinated services to a larger unexpected community of users despite the device used.

The identified hurdles include the following: (a) the connection between the SP and an enterprise are not secure; (b) there is no association between a user in the SP domain with the enterprise domain; (c) there is no way to expose enterprise features and services to users in the SP domain; (d) there are limited modes of communication between domains; (e) the authentication between a user and the SP domain is meaningless in the enterprise domain; and (f) Session Border Controllers and the transport provider (the companies that carry the messages between the two Session Border Controllers) often strip out information from the messages that are being transported either for security reasons or because they simply are not knowledgeable about what the information is and, therefore, decide to remove it.

One proposed solution to the above-noted problem has been developed by Tango Networks and is called Abrazo. Abrazo provides for mobile phone association ("twinning" or otherwise known as "Extension to Cellular") of the mobile phone identity in the SP IMS network to the internal identity in an enterprise IMS network. In this solution, each mobile phone user has two extensions associated with the user. A first extension which the PBX owns and is the primary extension in the enterprise. A second extension which is on the Abrazo server and is the extension that is twinned/mapped to the first extension. This solution is disadvantageous because twice as many licenses are required to be paid to Abrazo for the use of their system. A pilot number is used to route calls from the mobile operator network (SP) into the enterprise and ultimately to the Abrazo server. As can be appreciated by one skilled in the art, this is a somewhat costly and cumbersome solution.

SUMMARY

It is, therefore, one aspect of the present invention to provide the ability to transfer user identities and/or information across domains without compromising the security of user identity/information.

It is another aspect of the present invention to provide mechanisms which allow an enterprise to provide services, possibly via internal application sequencing, to both internal and external parties in a seamless and convenient manner.

Application sequencing is the ability to invoke applications, which can also be referred to as services, on behalf of a user. The applications are invoked based on triggers or rules defined in a user's profile. The trigger for invoking an application could be as generic as whenever the user originates a call, and can be as specific as to only invoke a particular application when a call is received from a specific user between a set of predefined hours (e.g., business hours or non-business hours). These triggers may be default triggers created by an administrative user or may be customized by the user, sometimes via a web-based GUI (Graphical User Interface), a telephone interface (audio and/or visual), or the like.

A standards-based interface developed by 3GPP called the ISC (IMS Service Control) interface defines the S-CSCF (Serving-Call Session Control Function) to invoke application sequencing. Some servers, such as Avaya's Aura™ server, can be configured as a PBX (Private Branch eXchange) or as a feature server. When configured as a PBX, endpoints (i.e., user communication devices) connect directly to the server and the server then connects to the S-CSCF via SIP trunks. When configured as a feature server, endpoints do not connect directly to the server. Rather, endpoints register to the S-CSCF and the S-CSCF invokes the server as a sequenced application. S-CSCF would invoke the server as one of potentially several sequenced application for all call originations and terminations to provide telephony features.

Sequenced applications are generally only aware of one half of a call. Specifically, sequenced applications are typically only aware of either the originating half or the receiving half of the call. A sequenced application that is invoked on call origination may know the called party number, but is not aware of the state of the called party or if a feature, such as Send All Calls, is active for the recipient.

The IMS is an architectural framework for making services available to a user community. Within the IMS architecture, the S-CSCF remains in the signaling path for the duration of a call and inspects every message associated with the call.

A user's profile for a particular domain, such as an enterprise profile or a home profile, usually contains a list of rules and services to invoke and specifies the order of invocation. The S-CSCF uses the information from each user's profile to trigger an application using the ISC (IMS Service Control) interface. The ISC interface is bidirectional, uses SIP, and is based upon IETF (Internet Engineering Task Force) RFC (Request For Comments) 3261, the entire contents of which are incorporated by reference.

Another type of application that can be used to provide services to users is known as a named application. Exemplary named applications include, without limitation, voicemail and conferencing application. Named applications differ from sequenced application in the method used to invoke them. Named applications are invoked when a user dials a phone number that specifically references the application. For example, subscribers log in to their voicemail account by dialing a pilot number. Users log in to a conference by dialing the conference bridge phone number. Capabilities contained in a named application may become applications that S-CSCF can sequence into a call.

S-CSCF allows multiple applications (named and sequenced0 to operate on the same call. This is a powerful advantage as it allows an enterprise to mix and match best-of-breed applications; no longer do all the required features need to be provided in the same software package, or by the same vendor.

Sequenced applications can be deployed in a customer's data center and are invoked by S-CSCF. As a result, all applications have an enterprise-wide view and are accessible by any user in the enterprise, regardless of the user's location.

Sequenced applications can be developed so that they are not aware of other applications around them. As a result, applications operate independently from one another, loosely coupled, providing flexibility and providing one of the more attractive attributes of an IMS network: the ability to rapidly deploy new applications without disrupting users, applications, or the features in use. ASs (Application Servers) allow deployment of new applications "hot" while the rest of the enterprise is running. When initially deployed, no users are invoking the application and there are no impacts to existing users or applications. Next, the profile of a small group of users is modified to invoke the new application. If the application works as expected, the trial can be expanded to more users and for a longer duration until the IT (Information Technology) organization is comfortable with the AS's performance. At that time, the application would be made available to the entire enterprise. If the application does not perform as expected, a small user community is impacted and the new application can be disabled.

In accordance with at least some embodiments of the present invention, an IMS peering method, system, and devices are provided. In some embodiments, IMS peering is a mechanism for invoking sequenced applications for calling and called parties that are from a different domain (e.g., not part of the enterprise domain) than the domain that contains the sequenced application. For example, calling and called parties that are not in the enterprise domain will typically not have administered applications. On the originating side, if the caller is outside of the enterprise domain, the user is not authenticated, and invoking an application on behalf of an unauthenticated user poses security risks. IMS peering enables sequenced applications to be invoked for a user in an adjacent network by providing authenticated information about the user and their device to the enterprise.

These capabilities leverage co-operation between the owners of adjacent networks, which may need to be negotiated. The connection between IMS peering servers can be persistent or established on-demand.

When a user on an SP network, for example, initiates a call, the SP is aware of the exact device from which the call originates. SPs do not typically authenticate the actual user of the device. By using IMS peering servers, the level of authentication that is known can be transmitted from one IMS infrastructure in one domain into another IMS infrastructure in another domain. The identity of the calling device can then be securely used in sequenced applications within the enterprise domain.

In accordance with at least some embodiments of the present invention, a user's identity is not always identical in two adjacent networks. The phone number they use in the public domain (e.g., their home phone number) is usually different from their enterprise phone number. The user in the adjacent domain may not even have a phone in the enterprise. They might be a customer or a person in another enterprise such as a vendor. It is also possible and potentially useful for a user from another domain to have an identity in the enterprise that is not a phone number—they might be identified by an account number or an email handle, for example. When a user's identity is communicated from one IMS network to another, IMS peering provides the ability to map a user's identification between the two networks, in the event their identification information is different in the two networks.

In some embodiments, when a user initiates a communication from a personal computer, cookies or other information can be made available to the recipient of the call automatically in order to streamline the communication. IMS peering similarly enables the sharing of information that a user wants to allow to be shared. A user could, for example, store an account number, billing address, or information about their purchasing preferences on a server at a SP or similar home domain along with a tag to identify what businesses/enterprises they want to share the information with. When the user calls an identified business, the SP can then provide to the called enterprise the additional information about the user via IMS peering. In some embodiments, a message or collection of messages may be formatted to carry some or all of the user information from one domain to another domain, possibly within either a body or header of the message. In some embodiments, the message may comprise a SIP and/or control message. In some embodiments, the message may comprise one or more packets which are capable of being transported across a communication network. Examples of such packets include, without limitation, SRTP (Secure Real-time Transport Protocol) packets or message(s), SRTCP (Secure Real-time Transport Control Protocol) packets or message(s), TCP (Transport Control Protocol) packets or message(s), UDP (User Datagram Protocol) packets or message(s), SCTP (Stream Control Transmission Protocol) packets or message(s), or the like.

In accordance with at least some embodiments of the present invention, IMS peering allows an adjacent IMS network to invoke an application in the enterprise. An SP network, for example, could then invoke a sequence application in the enterprise.

The features described herein may be implemented in any number of the following examples:

a. Peering servers in the SP and enterprise network authenticate the user;

b. SP peering server is sequenced on behalf of user;

c. SP peering server allows the call to continue normally, but sends additional information to the enterprise peering server;

d. Incoming calls to the enterprise are sequenced to the enterprise peering server;

e. Enterprise peering server associates additional information received prior to the call; and f. Enterprise peering server allows the call to continue normally.

By implementing one or more peering schemas described herein, a number of benefits may be realized including, without limitation:

a. Authentication of user's identity passes through SP boundary;

b. Customers in SP domain can establish policies on how enterprises communicate with them;

c. Customers in SP domain create trust relationships with enterprises to permit additional information to be shared (e.g., current location, device type, account numbers, social security, credit card information)

d. Enterprises can offer enterprise services to customers in the SP domain;

e. Enterprises can push multi-mode communication back to customers in the SP domain; and f. Peering servers provide a means to guarantee that the information which needs to be transmitted from the SP to the Enterprise arrives intact and unaltered.

Additionally, one of more of the following cost benefits can be realized:

a. SIP trunking requires far less equipment to link to the service provider network, reducing the cost of interconnect equipment leases;

b. SIP trunking allows the enterprise to do their own number redirection, eliminating the rerouting cost from the network;

c. Some services are network provided today, but this invention will allow these services to migrate internally to the enterprise thus eliminating the recurring service cost, such as Do-Not-Call, and Enterprise-Wide Conferencing are two examples;

d. Cost effective routing can be enforced, including Tail End Hop Off eliminating long distance and international tariffs; and e. The model of the adjunct is eliminated making services common, which reduces application integration and deployment costs;

f. Services that are targeted for a specific community need only be sourced and deployed for that community as opposed to the systems for that community (the legacy model) reducing licensing and deployment costs;

g. The elimination of communication boundaries reduces footprint, data center and power costs; and h. What used to be "peer" communication systems turn into device and service software bundles which should lower the cost of sourcing all communication system elements.

In accordance with at least some embodiments a communication method is provided that generally comprises:

receiving, at a first network, a first real-time communication initialization message from a first customer communication device operated by a first user;

authenticating the first user at the first network;

forwarding a second real-time communication initialization message from the first network to a second network, wherein the first network belongs to a first domain operated by a first entity and the second network belongs to a second domain operated by a second entity; and forwarding user authentication information from the first network to the second network such that the user authentication information is used by the second network in connection with processing one or more of (i) the second real-time communication initialization message and (ii) a communication session created with the second real-time communication initialization message.

The user authentication information can be used to sequence one or more communication applications at the second network during call setup (i.e., in connection with processing the real-time communication initialization message). Alternatively, or in addition, the user authentication information can be leveraged to obtain information about the user without directly retrieving said information from the user. For example, if the second network is an enterprise network operating a call center or the like, information about the user can be obtained by the second network without requiring the user to interact with an Interactive Voice Response (IVR) unit operated by the second network. This will greatly streamline traditional communication sessions encountered by users and may further increase the accuracy of the user information obtained by the second network (e.g., because the information is retrieved from another network, which may have originally obtained the user information under more stable conditions than an IVR interface).

The term "computer-readable medium" as used herein refers to any tangible storage and/or transmission medium that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the invention is considered to include a tangible storage medium or distribution medium and prior art-recognized equivalents and successor media, in which the software implementations of the present invention are stored.

The terms "determine," "calculate" and "compute," and variations thereof, as used herein, are used interchangeably and include any type of methodology, process, mathematical operation or technique.

The term "module", "agent", or "tool" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that individual aspects of the invention can be separately claimed.

The preceding is a simplified summary of embodiments of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

DETAILED DESCRIPTION

The invention will be illustrated below in conjunction with an exemplary communication system. Although well suited for use with, e.g., a system using a server(s) and/or database(s), the invention is not limited to use with any particular type of communication system or configuration of system elements. Those skilled in the art will recognize that the disclosed techniques may be used in any communication application in which it is desirable to share identities and customer information across domains.

The exemplary systems and methods of this invention will also be described in relation to analysis software, modules, and associated analysis hardware. However, to avoid unnecessarily obscuring the present invention, the following description omits well-known structures, components and devices that may be shown in block diagram form, are well known, or are otherwise summarized.

For purposes of explanation, numerous details are set forth in order to provide a thorough understanding of the present invention. It should be appreciated, however, that the present invention may be practiced in a variety of ways beyond the specific details set forth herein.

Figure 1:
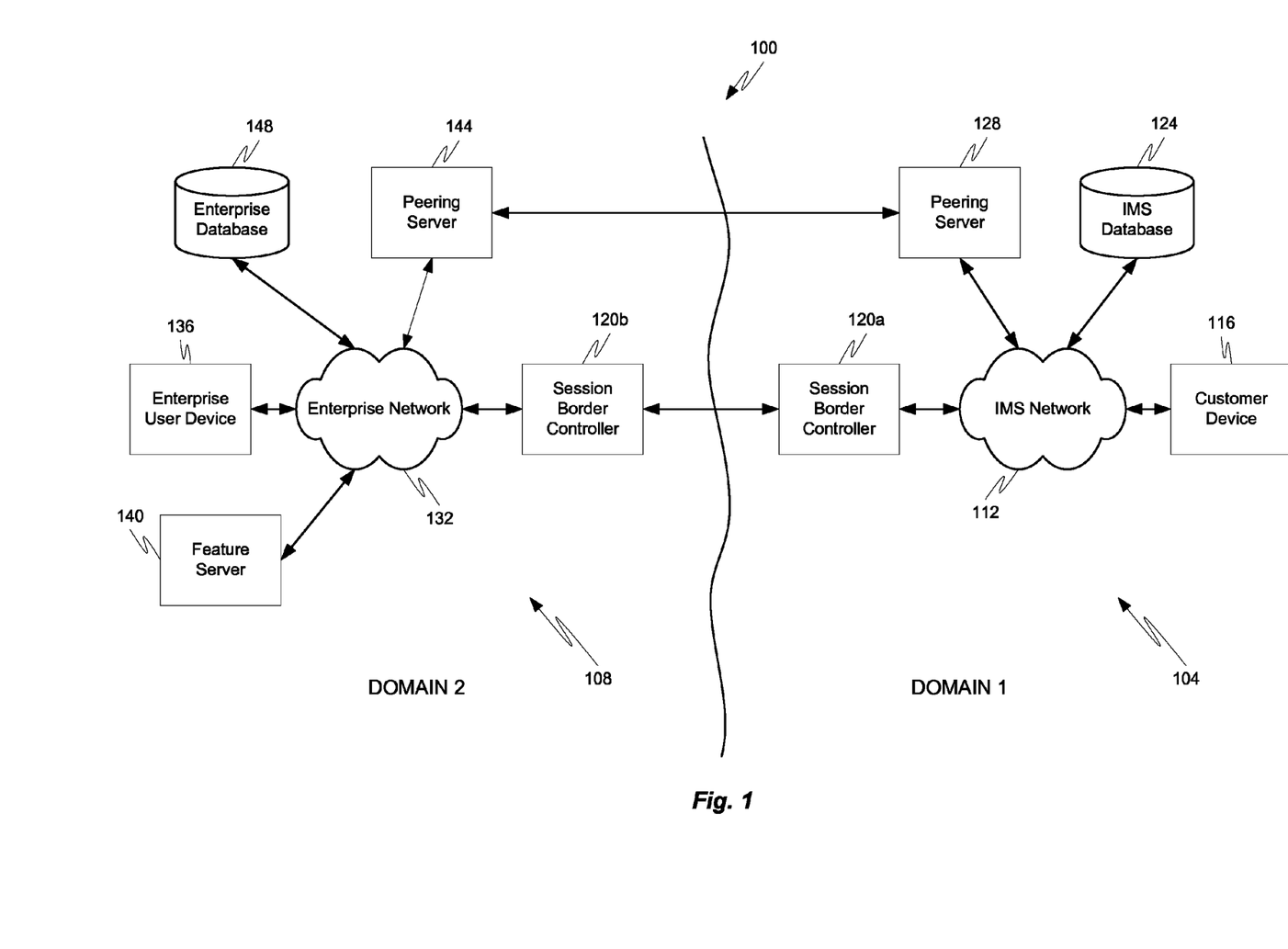
FIG. 1 is a block diagram depicting a communication system in accordance with at least some embodiments of the present invention.

With reference initially to FIG. 1, an exemplary communication system 100 will be described in accordance with at least some embodiments of the present invention. More specifically, the communication system 100 may comprise a plurality of communication devices in communication with one another using a number of possibly different communication modalities. In some embodiments, the communication system 100 includes two or more domains 104, 108, which are owned and operated by two different entities (e.g., two different companies, enterprises, etc.). A second domain 108 may comprise an enterprise domain whereas the first domain 104 may comprise an SP domain, although embodiments of the present invention are not limited to such a domain construct. More specifically, the first and second domains may be different SP domains (i.e., owned and operated by different SPs) or the first and second domains may be different enterprise domains (i.e., owned and operated by different non-SP enterprises).

In accordance with at least some embodiments of the present invention, the first domain 104 may comprise a first network 112, such as an IMS network, and a first database 124, such as an IMS database. The first network 112 may include communications equipment owned and/or operated by the entity of the first domain 104. Examples of such equipment may include, without limitation, routers, switches, servers, gateways, communications devices, etc. The first database 124 may include data about various users of the first network 112. As one example, the first database 124 may comprise data related to the subscribing users of the first network 112. Additionally, the first database 124 may include data (e.g., user identification information such as a username, password information, billing information, or the like) used to authenticate the users with the first network 112, thereby allowing the users to consume resources of the first network 112.

In accordance with at least some embodiments of the present invention a user in the first domain 104 may employ a customer communication device 116 to connect with the first network 112, thereby facilitating communication capabilities between the user and other users also having communication devices connected to the first network 112 or a different network. In some embodiments, a user or the customer communication device 116 may be authenticated by the first network 112 simply by being connected with the first network 112, possibly even in the absence of the user trying to initiate a communication session. In other embodiments, a user or the customer communication device 116 may be authenticated by the first network 112 when the user connects with the first network 112 via the customer communication device 116 and provides certain authentication information (e.g., username, password, Secure Communication Card (or SIM Card), etc.) to the first network 112. Once the user has been authenticated with the first network 112, the user may be allowed to utilize resources of the first network 112 (e.g., place and receive calls, send and receive emails, send and receive text messages or chats, view web content, watch television, etc.).

In some embodiments the user may be allowed to connect with other networks and other user in other networks via the first network 112. As one example, the user may be allowed to place a call to another user of the second domain 108 via the first network 112. Facilitation of these inter-network communication capabilities may be accommodated by a first Session Border Controller (SBC) 120a and a first peering server 128 also included in the first domain 104 and connected with the first network 112. As can be appreciated by those skilled in the art, although the first SBC 120a and the first peering server 128 are depicted as being separate from the first network 112, one or both of these devices may be included in the network 112 or may be provided on a single device/server rather than two different devices.

The first SBC 120a of the first domain 104 is connected to the second domain 108 via a second SBC 120b. The SBCs 120a, 120b are devices used by the domains 104, 108 to exert control over the signaling and usually also the media streams involved in setting up, conducting, and tearing down telephone calls or other interactive media communications. The SBCs 120a, 120b may also have an influence on the data streams that comprise sessions, as they traverse borders between one part of a domain and another. Additionally, SBCs 120a, 120b often provide measurement, access control, and data conversion facilities for the calls they control.

In addition to comprising an SBC 120b, the second domain 108 may further include a second network 132, such as an enterprise network, and a second database 148, such as an enterprise database. The second domain 108 may also comprise one or more enterprise user communication devices 136, a feature server 140, and a second peering server 144.

The second network 132 may be similar to the first network 112 in that the second network 132 may include one or more communication devices for facilitating communications throughout the second domain 108 and with other communication networks in other domains. In some embodiments the second network 132 may include one or more of a switch, router, server, gateway, or other device used to set up and/or facilitate communication sessions.

Likewise, the second database 148 may include user data for the various users in the second domain 108. In other words, members of the second domain 108 may be allowed to register with the second network 108 and utilize resources of the second network 108 by virtue of their registration with the network. Thus, the second database 148 may include user authentication information for its various registered users (e.g., enterprise users) and other more generic user information.

In accordance with at least some embodiments of the present invention, user information from the first domain 104 may be shared with the second domain 108 via the first and second peering servers 128, 144. The user information, which may include user authentication information, that is shared between domains may be stored in the first and second databases 124, 148, thereby supplementing the information that each domain has for a non-subscribing user. More specifically, user information and user authentication information stored in the first database 124 for a first user that is a subscribing user of the first network 112 may be provided to the second network 132 where it can be stored in the second database 148 for use by the second network 132 during the processing of a call and/or call-initialization message received at the second network 132 from the first user via the first network 112.

As can be seen in FIG. 1, the peering servers 128, 144 may be directly connected to one another or may be connected to one another via some other intermediary device. In accordance with at least some embodiments of the present invention, the peering servers 128, 144 can have a dynamic or persistent link to other peering servers 128, 144 using Transport Layer Security (TLS), Hypertext Transfer Protocol Secure (HTTPS), or any other secure message transport mechanism known in the art. Alternatively, or in addition, the peering servers 128, 144 can affect the SIP session crossing a particular network boundary by embedding instructions in a SIP message bound for the SBC 120*a*, 120*b* that direct the SBCs 120*a* and/or 120*b* not to strip any user information from a particular SIP message (or from messages transmitted during an established session).

In accordance with at least some embodiments of the present invention, the feature server 140 in the second domain 108 is usually only allowed to provide certain features to "internal users" and not provide such features to "external users." As an example, the feature server 140 may be configured to provide EC-500 (extension to cellular feature) to an enterprise user communication device 136 (i.e., an internal user) but not provide EC-500 to the customer device 116 (i.e., an external user). EC-500 is an advanced mobility feature that loosely couples an off-PBX telephone number (cellphone number, home phone, etc.) with an enterprise telephone number such that when the enterprise number is alerted, the call is extended at the same time to the off-PBX number. The call may be picked up at either device by the user. Other features offered by the feature server 140 may also be limited based on the whether the user is identified as an internal or external user.

These restrictions are usually implemented because a higher level of trust exists between the second network 132 and internal users as compared to the level of trust which exists between the second network 132 and external users. Thus, since internal users are generally required to authenticate with the second network 132 they are provided access to resources which may not be accessible to external users. Embodiments of the present invention propose a mechanism which will allow external users to obtain the higher level of trust with the second network 132, thereby allowing such users to utilize resources, such as the feature server 140, not usually available to external users. Although several different embodiments of the present invention will be discussed with certain types of resources and features of a feature server 140, one skilled in the art will appreciate that any type of resource or feature may be provided by the feature server 140 to an internal user and an external user upon receiving authentication information either directly from the user or via the user's "home network." As noted above, this authentication information may be shared between networks via peering servers 128, 144 provided in each domain 104, 108.

The networks 112, 132 may comprise any type and any number of communication mediums and devices which are capable of supporting communication sessions, such as voice calls, video calls, chats, emails, chats, TTY calls, multimedia sessions, or the like. The networks 112, 132, when embodied as an enterprise network, may include a Local Area Network (LAN), a Wide Area Network (WAN), a Session Initiation Protocol (SIP) network, and any other type of packet-switched or circuit-switched network known in the art. In addition, it can be appreciated that the enterprise network 132 need not be limited to any one network type, and instead may be comprised of a number of different networks and/or network types. The networks 112, 132, when embodied as an SP network, may include an IMS network or any other type of network which provides access to one or more of the Internet, a standard Plain Old Telephone System (POTS), an Integrated Services Digital Network (ISDN), the Public Switched Telephone Network (PSTN), and any type of known cellular communication network.

Figure 2:
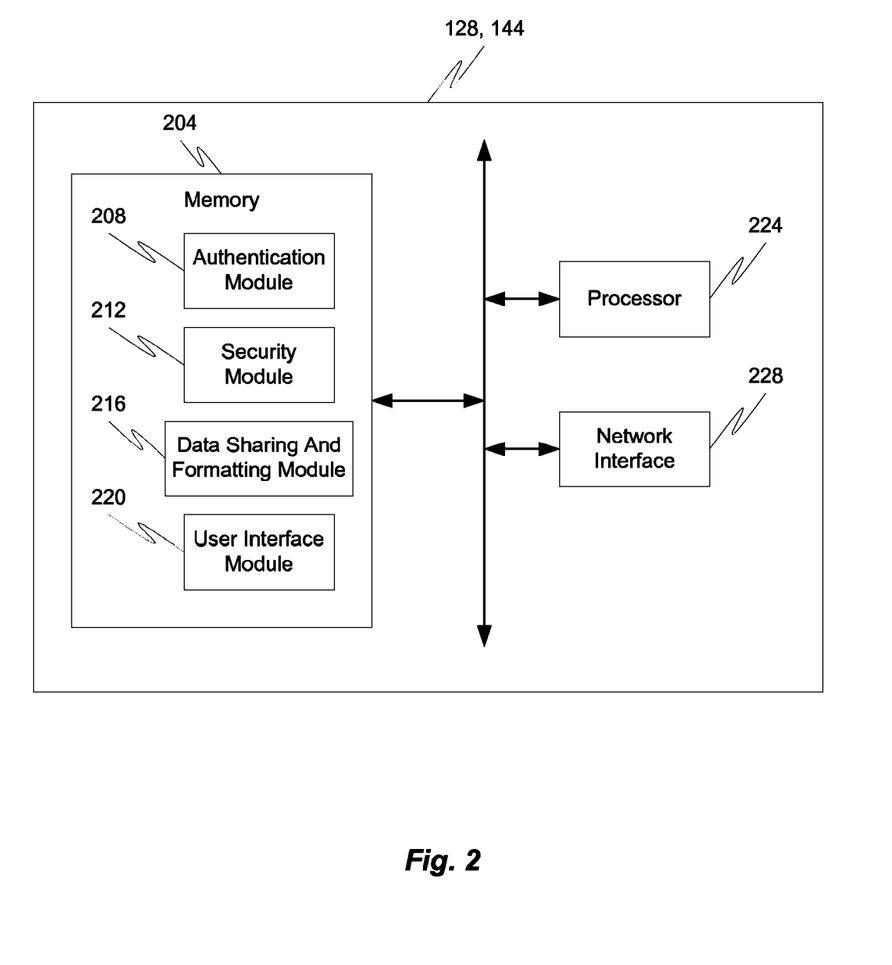
FIG. 2 is a block diagram depicting a peering server in accordance with at least some embodiments of the present invention.

With reference now to FIG. 2, additional details of a peering server 128, 144 will be described in accordance with at least some embodiments of the present invention. One or both peering servers 128, 144 may include memory 204 including a number of different modules or applications to facilitate transferring user information and user authentication information across domain boundaries. The peering servers 128, 144 may further include a processor 224 for executing the contents of memory 204 as well as a network interface 228 for connecting the peering server 128, 144 with other network devices and/or other peering servers.

In some embodiments the memory 204 may include an authentication module 208, a security module 212, a data sharing and formatting module 216, and a user interface module 220. The authentication module 208 may provide capabilities for retrieving user authentication information, either directly from a user or from a database. The authentication module 208 may also provide capabilities for sending user authentication information to other peering servers and managing user authentication information received from other peering servers.

The security module 212 may provide capabilities for securing data transmitted between peering servers. More specifically, since the peering servers may be adapted to transmit user information and/or user authentication information, there may be a need to encrypt or otherwise secure data before it is transmitted to another peering server. The security module 212 provides the facilities for securing any data that is sensitive and should not be sent across a communication network in the clear.

The data sharing and formatting module 216 may provide capabilities for transferring non-user authentication information to other peering servers. Furthermore, the data sharing and formatting module 216 may be adapted to receive user information from other peering servers and format such data such that it can be used by the network to which the peering server is attached. In other words, data, such as user information, may not necessarily be in the same format at one network as it is in another network. For example, one network may utilize a first data format or schema and another network may utilize a second data format or schema. In this situation the data sharing and formatting module 216 may be configured to re-format data received from one peering server before it is stored in a local database (i.e., a database in the same domain as the peering server performing the reformatting).

The user interface module 220 may provide capabilities which allow a user to interface with the peering server 128, 144 and provide data sharing preferences to the peering server. More specifically, a user may be allowed to interface with a peering server in a first domain and identify data sharing preferences for one, two, three, four, or more other domains. The data sharing preferences for the other domains may be the same, but this is not necessarily required. For example, a user may define different data sharing preferences for different domains and different peering servers within different domains. In some embodiments, the user interface module 220 may comprise a GUI (Graphical User Interface) which is provided to a user, possibly over the Internet (i.e., a web-interface). In other embodiments, the user interface module 220 may comprise a voice interface which is provided to a user via an IVR or the like. Regardless of its format, the user interface module 220 is capable of receiving user preferences related to data sharing and enforcing such preferences among the other contents of memory 204.

Figure 3:
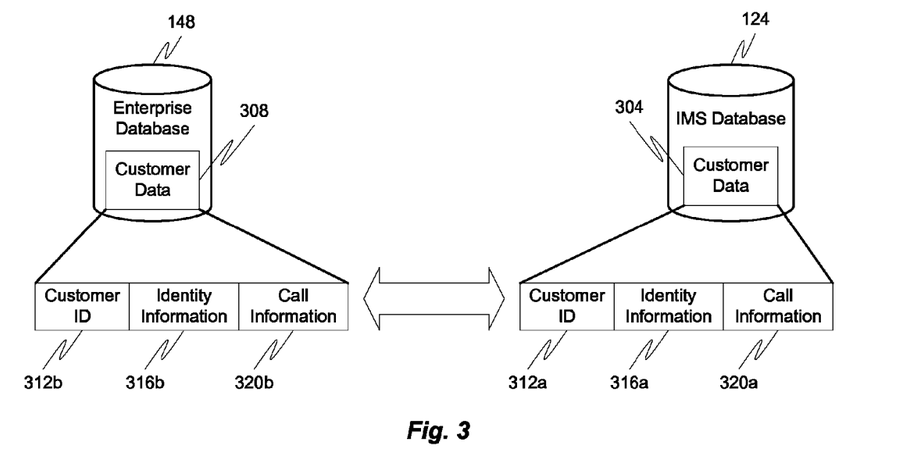
FIG. 3 is a block diagram depicting an exemplary set of data structures used in accordance with at least some embodiments of the present invention.

With reference now to FIG. 3, an exemplary set of data structures will be described in accordance with at least some embodiments of the present invention. As noted above a first and second database 124, 148 in different domains may be configured to store customer data 304, 308. Furthermore, the peering servers 128, 144 provide the facilities to share customer data or information across domain boundaries. Accordingly, conditions exist whereby a first instance of customer data 304 may be stored in a first database 124 and some or all of that customer data 304 may be transferred to a second database 148 in a different domain. Once customer data has been transferred across a domain boundary (usually defined by the existence of one or more SBCs 120a, 120b), a second instance of customer data 308 may be stored in the second database 148. In some embodiments a user may allow all of their information, possibly including authentication information, to be shared from one domain with another domain. In other embodiments a user may allow only a subset of the first instance of customer data 304 to be shared with other domains.

In any event, customer data 304, 308 stored at any particular database 124, 148 may include one or more fields such as an identification field 312a, 312b, an identity information field 316a, 316b, and a call information field 320a, 320b. The identification filed 312a, 312b may include domain specific customer identification information as well as identification information for the user in other domains. Thus, in some embodiments a user's identification information in one domain may be mapped to a user's identification information in another domain. This mapping of identification information (e.g., username, address, Social Security Number, primary telephone number, etc.) may allow the domain receiving the user information to quickly determine if there is some user information for the particular user already in the local database before extracting all of the user information provided by the other domain. Not only does this ensure that accurate user records are maintained within the domain, but it also potentially reduces the amount of processing that needs to be performed by the peering server which receives the user information.

The identity information field 316a, 316b may include authentication information for a particular user. In other words, the identity information field 316a, 316b may include username information, password information, electronic certificate information, and any other type of information used to authenticate users.

The call information fields 320a, 320b are provided to store call identification information or other descriptors of a communication session (e.g., voice call, video call, text session, chat, email string, TTY session, etc.). In some embodiments, the triggering event for transferring user information from one domain to another domain is the receipt of a communication initialization message at one domain, where the communication initialization message is targeted at another domain. Since receipt of such a message or collection of messages may be the triggering event for transferring user information across domain boundaries, embodiments of the present invention allow the peering servers 128, 144 to share call identification information (or any other type of session identifiers) when transferring the user information. This allows the peering server 128, 144 which receives the user information to quickly identify the user in the second domain, possibly authenticate the user in the second domain, and process the communication initialization message or a communication session spawned by the initialization message with the received user information. Since the user information is transferred along with the communication initialization message, embodiments of the present invention allow an association to be made between the user information and the communication initialization message and any subsequent communication sessions created thereby. This association between user information and the communication initialization message and/or communication session allows the domain receiving the user information to treat the user as an internal or trusted user of the domain even though that user is connecting to the domain through an external source and through an SBC 120a, 120b.

Figure 4:
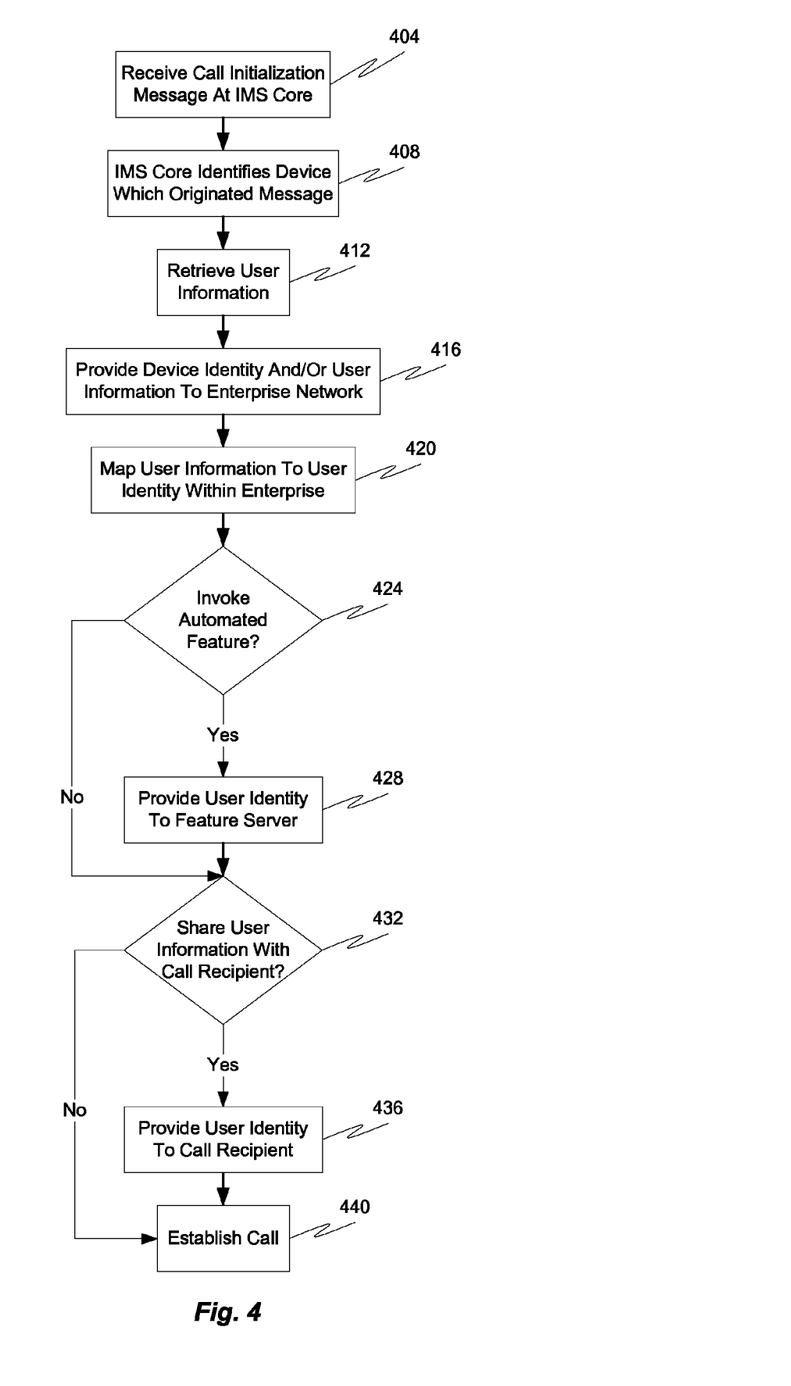
FIG. 4 is a flow diagram depicting an exemplary communication method in accordance with at least some embodiments of the present invention.

Referring now to FIG. 4, an exemplary communication method will be described in accordance with at least some embodiments of the present invention. Although this general method will be described in connection with a call, those skilled in the art will appreciate that embodiments of the present invention are not so limited. More specifically, embodiments of the present invention are equally applicable to voice calls, video calls, text sessions, chat sessions, email strings, data collaborations, or any other multimedia communication session.

The method is initiated when a call initialization message is received at the first network 112 from a customer communication device 116 (step 404). The call initialization message may include a call setup signal, an H.323 call setup message, a SIP INVITE message, or any other type of message or collection of messages used to initiate a communication session.

Thereafter, the first communication network 112 identifies the customer communication device 116 which transmitted the received message (step 408). This identification may be accomplished by analyzing the message or a header of the message, which may provide an IP address or similar identifier of the customer communication device 116.

Upon identifying the communication device 116, the first communication network 112 invokes the first peering server 128 which retrieves the relevant user information from the first database 124 (step 412). More particularly, the first peering server 128 may determine a user that is associated with the identified communication device 116. In some embodiments a one-to-one relationship between a user and communication device 116 may be assumed if the communication device is not a shared communication device. If, however, multiple users are associated with a single communication device, the first peering server 128 may retrieve information for all of the users who are known to be associated with the communication device. In some embodiments, if there are multiple users associated with a single communication device, the first peering server 128 may send a query the user for additional identification information (e.g., username, mother's maiden name, date of birth, etc.).

Once the relevant user information has been retrieved by the first peering server 128, the method continues with the first peering server providing the device identity and/or user information to the second peering server 144 across the domain border (step 416). This allows the second network 132 to access the user information without necessarily directly requesting the information from the user. Furthermore, call identification information can be provided along with the user information to allow the second network 132 to create an association between the user information and call.

Once the user information is received at the second peering server 144, the second peering server 144 maps the received user information to any local user information within the second domain 108 (step 420). In other words, the second peering server 144 may determine if the user is also an internal user, even though the user is connecting with the second network 112 through the second SBC 120b.

Thereafter and based on the identity mapping, the second network 132 determines whether to invoke an automated feature such as a sequenced application or named application (step 424). If there are no automated features to be invoked during the call setup, then the method skips to step 432. If, however, at least one automated feature is to be invoked in the second domain 108, then the user identity is provided to the feature server 140 (step 428) and the feature server 140 is allowed to sequence the necessary applications into the call setup processing or initialize any named applications for use during the call.

The method continues with the second peering server 144 determining whether user information will be shared directly with the call participant (step 432). If this query is answered affirmatively, then a certain amount of user information, possibly including user identification information is provided from the peering server 144 to the call recipient (step 436). Typically, the information would be provided to a Feature Server (such as feature server 140 in FIG. 1) and the feature server would determine how the information will affect the call. It might include previous call history with the calling party, or social network information and states of the caller, or it may retrieve account information on the caller and invoke a supplementary application and display associated with the user. This is not intended to be an exhaustive list of potential actions that could be enabled on the callers behalf for the session initiated. The type of user information provided to the call recipient may include call history between the caller and the enterprise operating the second domain 108, billing information for the caller, identification information for the caller, and other pertinent information. The transferring of user information to the call recipient may help the recipient process the call in a more efficient manner, which is especially useful in a contact center setting. Furthermore, the calling user may be allowed to receive personalized treatment without interfacing with an IVR or some other automated data retrieval agent. After the user information has been provided to the recipient, or in the event that no user information was to be shared with the recipient, the method ends with the establishment of the call (step 440).

There are a number of different use cases in which the above-described system configuration and communication methods may be employed to facilitate a more efficient communication session between users of different domains. A couple exemplary use cases will be discussed in more detail to further illustrate the advantages offered by embodiments of the present invention.

As a first example, current use of the EC-500 feature allows a user to originate a call from their cell phone and have the call appear on their Enterprise network as if it originated from their desk phone with the desk phone number as the Calling Name and Calling Number. In accordance with at least some embodiments of the present invention, IMS Peering and sequenced applications expand the ability to associate an external device with the user and greatly expands the origination services that can be provided for the caller.

For a user originating a call from their cell phone, home phone, or an Internet connection to a user in the enterprise, IMS peering can communicate the calling device to the enterprise. The enterprise network has the opportunity to invoke a sequence application via the feature server 140 for the user in the same way as it could if the caller were using their desk phone. The enterprise network also has the opportunity to invoke additional sequenced applications as it knows the user is remote, and there may be services that improve a remote user's experience.

An example service is call recording. If all of a users calls, both incoming and outgoing, are to be recorded, a sequenced application can recognize that the call is incoming to the enterprise from a known user and invoke call recording on their behalf.

As another example, IMS peering can be extended to networks that the caller does business with. For example, a caller dials into the contact center of a business. The SP provides to the business's IMS network the authenticated identity of the device making the call. By knowing the device that is making the call, the contact center may reduce or eliminate the amount of verbal authentication performed and thereby streamline the interaction.

In addition to identity authentication, the SP can provide to the contact center with the type of device the caller is on as well as the types of devices the caller owns. Suppose a caller originates a call from their home land line and the caller also has a cable or satellite television connection with the SP. The SP could inform the contact center of the existence of the television set. If the caller is considering purchasing a product, a picture of the product and the invoice associated with the product could be pushed to their television set for viewing. Another use case is if the caller is calling to create a trouble ticket, a text version of the ticket could be pushed to the screen. These visual additions to the communication can greatly enhance the caller's experience and also facilitate the contact center agent in handling the call.

Having access to a visual interface can also improve a user's interactions with a contact center's IVR. After connecting to an IVR, the IVR system could push to the television a text rendition of the call tree in addition to or in place of the voice prompts that describe the call tree to the user, and improve the caller's ability to navigate the menus verbally or via touch tones.

As a third example, when a user calls a business, they want to streamline the conversation as much as possible. The user can decide to trust a specific business and automatically send information to them when the user calls the business. The user would store information with their SP. For example, they would store their billing address information along with a list of businesses that the user wants the SP to automatically share the information with. When the user contacts a business, the SP would also send to the business, in addition to the call, the information the user has allowed to be shared. In this way, the user can store and manage in one centralized location, information they want shared with multiple entities separated by SBCs.

As a fourth example, an enterprise could establish a relationship with a SP for how to reach a user's cell phone. When an enterprise user calls a cell phone, the enterprise would invoke a sequenced application via IMS Peering at the SP to determine the location of the cell phone. After the SP responds, the enterprise determines how to route the call. Suppose a caller in Denver calls a cell phone whose home service is in Denver while the cell phone user is currently roaming in Italy. The enterprise would invoke a call routing sequenced application at the SP, and the application would respond by indicating that device is remote and sending the land-mobile number to reach the device in Italy. The enterprise network 132 could then route the call on the eEnterprise network to Italy and then hop off the network to an Italian SP and thereby reduce the PSTN charges for the call.

While the above-described flowchart has been discussed in relation to a particular sequence of events, it should be appreciated that changes to this sequence can occur without materially effecting the operation of the invention. Additionally, the exact sequence of events need not occur as set forth in the exemplary embodiments. The exemplary techniques illustrated herein are not limited to the specifically illustrated embodiments but can also be utilized with the other exemplary embodiments and each described feature is individually and separately claimable.

The systems, methods and protocols of this invention can be implemented on a special purpose computer in addition to or in place of the described communication equipment, a programmed microprocessor or microcontroller and peripheral integrated circuit element(s), an ASIC or other integrated circuit, a digital signal processor, a hard-wired electronic or logic circuit such as discrete element circuit, a programmable logic device such as PLD, PLA, FPGA, PAL, a communications device, such as a server, personal computer, any comparable means, or the like. In general, any device capable of implementing a state machine that is in turn capable of implementing the methodology illustrated herein can be used to implement the various communication methods, protocols and techniques according to this invention.

Furthermore, the disclosed methods may be readily implemented in software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized. The analysis systems, methods and protocols illustrated herein can be readily implemented in hardware and/or software using any known or later developed systems or structures, devices and/or software by those of ordinary skill in the applicable art from the functional description provided herein and with a general basic knowledge of the communication and computer arts.

Moreover, the disclosed methods may be readily implemented in software that can be stored on a storage medium, executed on a programmed general-purpose computer with the cooperation of a controller and memory, a special purpose computer, a microprocessor, or the like. In these instances, the systems and methods of this invention can be implemented as program embedded on personal computer such as an applet, JAVA® or CGI script, as a resource residing on a server or computer workstation, as a routine embedded in a dedicated communication system or system component, or the like. The system can also be implemented by physically incorporating the system and/or method into a software and/or hardware system, such as the hardware and software systems of a communications device or system.

It is therefore apparent that there has been provided, in accordance with embodiments of the present invention, systems, apparatuses and methods for sharing information across domains. While this invention has been described in conjunction with a number of embodiments, it is evident that many alternatives, modifications and variations would be or are apparent to those of ordinary skill in the applicable arts. Accordingly, it is intended to embrace all such alternatives, modifications, equivalents and variations that are within the spirit and scope of this invention.

What is claimed is:

1. A method, comprising:
receiving, at a first network, a first real-time communication initialization message from a first customer communication device operated by a first user;
authenticating the first user at the first network, wherein authenticating comprises receiving authentication information at the first network from the first user connected with the firs network via the first customer communication device;
forwarding a second real-time communication initialization message from the first network to a second network, wherein the first and second real-time communication initialization messages are the same or different and wherein the first network belongs to a first domain operated by a first entity and the second network belongs to a second domain operated by a second entity;
forwarding user information from the first network to the second network, such that the user information is used by the second network in connection with processing one or more of (i) the second real-time communication initialization message and (ii) a communication session created with the second real-time communication initialization message;
retrieving, by the first network, user information for the first user from a database in the first domain, wherein the user information retrieved from the database in the first domain includes one or more of account number, billing information, payment information, communication history, and communication preferences; and
providing, by the first network to the second network, at least a portion of the user information retrieved from the database.

2. The method of claim 1, wherein the user information includes one or more of results of the authentication of the first user at the first network, an authentication certificate, an identity of the first user, and identification information associated with the first user.

3. The method of claim 2, wherein at least one of an identity of the first user and identification information associated with the first user is further included in the user authentication information, the method further comprising:
mapping, by the second network, an identity of the first user in the first network to an identity of the firs user in the second network; and
utilizing the identity of the first user in the second network to retrieve user information for the first user from a database in the second domain, wherein the user information retrieved from the database in the second domain includes one or more of account number, billing information, payment information, communication history, and communication preferences.

4. The method of claim 1, wherein less than all of the user information retrieved from the database is provided to the second network.

5. The method of claim 1, further comprising:
receiving, at the first network, user input from the first user, the user input defining the first user's preferences for sharing information with the second network; and
determining, based on the user input, the amount of user information to be included in the at least a portion of the user information which is provided to the second network.

6. The method of claim 1, further comprising:
receiving, by the second network, the user authentication information; and
invoking at least one application at the second network for the first user based on the received user authentication information.

7. The method of claim 1, further comprising:
retrieving, by the first network, user information for the first user from a database in the first domain, wherein the user information includes data sharing preferences for two or more domains.

8. The method of claim 1, wherein the first real-time communication initialization message is one of a call setup signal, an H.323 call setup message, and a SIP INVITE message.

9. A communication system, comprising:
a first network belonging to a first domain, the first network including a first server and a first database;
a second network belonging to a second domain, the second network including a second server and a second database, wherein the first and second domains are distinct from one another and operated by different entities, wherein the first server, upon receiving a first real-time communication initialization message from a first customer communication device operated by a first user, is configured to authenticate the first user by receiving authentication information from the first user via the first customer communication device operated by the first user, forward a second real-time communication initialization message to the second network, wherein the first and second real-time communication initialization messages are the same or different, and further forward user authentication information to the second network such that the user authentication information is used by the second server in connection with processing one or more of (i) the second real-time communication initialization message and (ii) a communication session created with the second real-time communication initialization message, wherein the first server is configured to retrieve user information for the first user from the first database, the user information including one or more of account number, billing information, payment information, communication history, and communication preferences and, upon retrieving the user information, to provide, to the second serer, at least a portion of the user information retrieved from the first database.

10. The system of claim 9, wherein the first and second real-time communication initialization messages are different.

11. The system of claim 9, wherein the user authentication information includes one or more of results of the authentication of the first user at the first network, an authentication certificate, an identity of the first user, and identification information associated with the first user.

12. The system of claim 11, wherein at least one of the identity of the first user in the first network and identification information associated with the first user is included in the user authentication information and wherein the second server is further configured to map an identity of the first user in the first network to an identity of the first user in the second network and utilize the identity of the first user in the second network to retrieve user information for the first user from the second database, wherein the user information includes one or more of account number, billing information, payment information, communication history, and communication preferences.

13. The system of claim 9, wherein all user information retrieved from the first database is provided to the second server.

14. The system of claim 9, wherein the first server is configured to receive user input from the first user, the user input defining the first user's preferences for sharing information with the second network and determine, based on the user input, the amount of user information to be included in the at least a portion of the user information which is provided to the second server.

15. The system of claim 9, wherein the second server is configured to receive the user authentication information and invoke at least one application in the second network for the first user based on the received user authentication information.

16. The system of claim 9, wherein the first real-time communication initialization message is one of a call setup signal, an H.323 call setup message, and a SIP INVITE message.

17. A method comprising:
receiving, at a second network, user authentication information from a first network, the user authentication information representing an authentication that occurred between a first user and the first network, wherein the authentication comprises receiving authentication information at the first network from the first user connected with the first network via a customer communication device;
receiving, at the second network, a real-time communication initialization message from the first network;
using, at the second network, the user authentication information in connection with processing one or more of (i) the real-time communication initialization message and (ii) a communication session created with the real-time communication initialization message, wherein at least one of an identity of the first user and identification information associated with the first user is further included in the user authentication information;
mapping, by the second network, an identity of the first user in the first network to an identity of the first user in the second network; and utilizing the identity of the first user in the second network to retrieve user information for the first user from a database in the second domain, wherein the user information retrieved from the database in the second domain includes one or more of account number, billing information, payment information, communication history, and communication preferences.

18. The method of claim 17, further comprising:
identifying a first application executable by and contained within a server in the second network; and
invoking the first application during creation of the communication session.

19. The method of claim 17, wherein the user authentication information from the first network includes one or more of results of the authentication of the first user at the first network, an authentication certificate, an identity of the first user, and identification information associated with the first user.

20. The method of claim 17, wherein the real-time communication initialization message is one of a call setup signal, an H.323 call setup message, and a SIP INVITE message.

* * * * *

UNITED STATES PATENT AND TRADEMARK OFFICE
CERTIFICATE OF CORRECTION

| | | |
|---|---|---|
| PATENT NO. | : 8,484,704 B2 | Page 1 of 1 |
| APPLICATION NO. | : 12/701168 | |
| DATED | : July 9, 2013 | |
| INVENTOR(S) | : David L. Chavez et al. | |

It is certified that error appears in the above-identified patent and that said Letters Patent is hereby corrected as shown below:

In the Claims:

Column 16, line 40, delete "firs" and insert --first--.

Column 17, line 9, delete "firs" and insert --first--.

Column 18, line 5, delete "serer" and insert --server--.

Signed and Sealed this
Third Day of September, 2013

Teresa Stanek Rea
*Acting Director of the United States Patent and Trademark Office*